March 16, 1937.  C. H. SHEPHERD  2,073,952
SEPARATION OF MATERIAL
Filed Sept. 21, 1934    2 Sheets-Sheet 1

Inventor
Claude H. Shepherd
By: Jabel Carlson & Wells Attys.

March 16, 1937.    C. H. SHEPHERD    2,073,952
SEPARATION OF MATERIAL
Filed Sept. 21, 1934    2 Sheets-Sheet 2
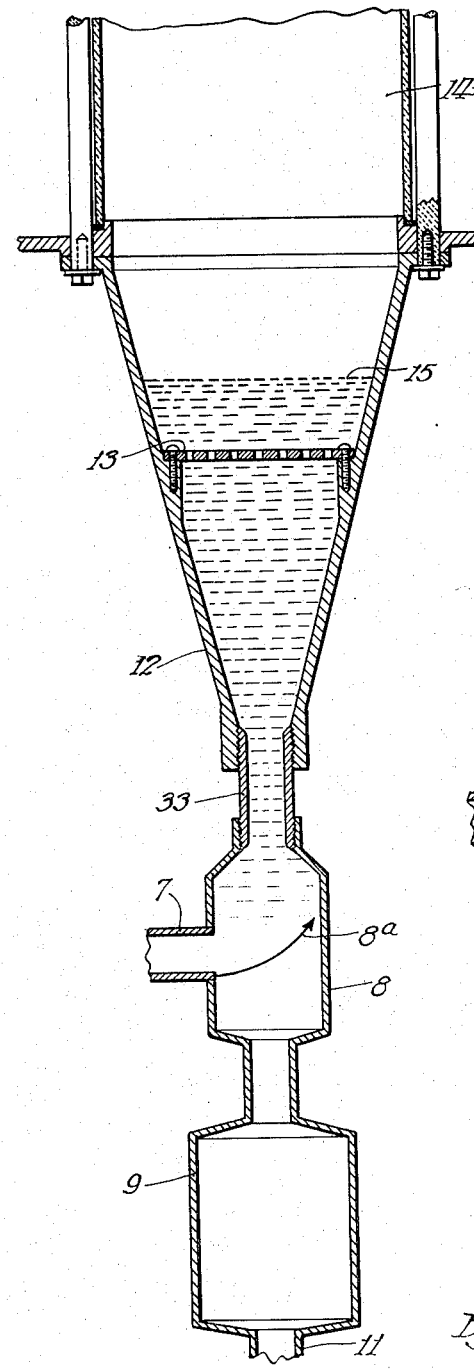
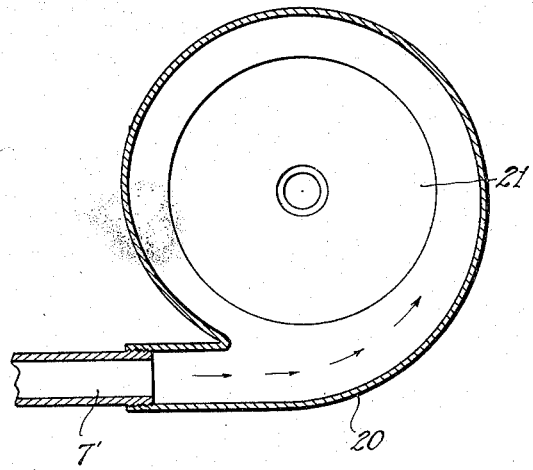
Inventor
Claude H. Shepherd.
By Zabel Carlson & Wells
Attys Patented Mar. 16, 1937

2,073,952

UNITED STATES PATENT OFFICE 2,073,952

SEPARATION OF MATERIAL

Claude H. Shepherd, Chicago, Ill.

Application September 21, 1934, Serial No. 744,935

8 Claims. (Cl. 209—155)

This invention relates to the separation of materials and more particularly to the separation of solid materials of different specific gravities and physical characteristics.

The invention in one of its embodiments contemplates as one of its objects the provision of a method of separation utilizing a gradation in velocity of the material under controlled conditions between a maximum or non-separating velocity and a minimum velocity or maximum separation velocity as a continuous process. The invention in such embodiment contemplates the provision of a system wherein the material is caused to recede from the initial high velocity to a lower separation velocity while moving in such a direction as to permit the maximum gravitational or similar effect thereon, the separation steps being accomplished under the most favorable conditions.

It is a further feature of the invention that in certain forms advantage is taken of the beneficial effects which may be produced electrically or electrostatically upon a liquid or fluid having fine materials held therein in suspension. This last feature is particularly of advantage for example in the nullification or overcoming of the effect of the so-called Brownian movement. In colloidal mixtures, it has been found that the solid particles, due to their collision with other molecules of the liquid in which the particles are suspended, move about and remain in suspension. If this apparently aimless movement of the solid particles can be changed to a movement in a definite direction, then the solid particles can be more readily separated from the carrier liquid.

The invention in one of its forms is particularly adapted for the separation and recovery of heavy free metals from lighter conglomerates, as, for example, the separation of free gold and other metals from sand.

Perhaps the most prevailing method of separation of these heavy metals in the past has been the use of a sluice box in its various forms and adaptations. This method generally consists in passing the conglomerate by means of the carrier fluid such as water through a slanting trough in such a manner that the materials will pass through and out of the trough under the influence of terrestrial gravitation. In the recovery of gold, particularly, the trough is furnished with a number of cross cleats or partitions on the bottom so that the heavier materials will settle to the bottom and lodge behind the cleats, or the bottom of the trough may be so constructed as to provide a material into which the gold will sink, such as mercury for example, while the sand and lighter particles will flow over the surface of the mercury. In addition to this fact, gold and mercury have a decided affinity for each other. This takes the form of intermolecular infiltration of the molecules of gold into the space or interstices between the molecules of mercury, which has a specified gravity of 13.56 as compared to a specific gravity of 19.32 for gold. The resulting mixture of gold and mercury is called an amalgam.

I am aware that various systems have been proposed wherein the conglomerate was carried by pressure or by means of a carrier liquid through a body of mercury. In some of these devices, the conglomerate was discharged down into the mercury body and then drawn off from above the mercury. In others, the conglomerate is introduced below the mercury level and discharged upwardly through the mercury. It is also old in the art to utilize a source of electricity for the purpose of causing the metal to be moved toward the mercury and for the purpose of preventing fouling of the mercury. While my invention may embody steps which resemble the aforementioned prior disclosures, it is clearly distinguished from them as will be apparent from the following description.

Since this system is concerned primarily with the recovery of free metals or solids from natural deposits, it is of interest to consider the nature of the gold or other metals as found in such deposits. Taking gold as an example, it is found that the fineness of the particles of gold varies from the colloidal form into and through the submicroscopic sizes and upward through particles of microscopic gold to particles which are visible to the naked eye. Larger particles of gold may be of any other size and are known as mass gold. The free metal deposits are found mixed with large quantities of other materials, and, since the deposition of these deposits has been accomplished largely by erosion and transportation, the particles are made increasingly finer as the erosive action continues. In many cases along the surface of the earth, extrusion of metallic gold will have occurred at points subjected to weathering processes. Masses of gold will have become detached and will have been carried along in alluvial streams. As the action progresses, the gold, being soft, will be ground more and more finely by the action of the neighboring masses of harder materials and the water. The final result will be to reduce the particles of gold and other metals from masses of any conceivable size down through the range of sizes as stated above to a point which will include the submicroscopic and colloidal forms. The latter particles will be, to all intents and purposes, the equivalent of molecules of true liquid while maintaining inherently the true specific gravity of the element itself.

In the case of submicroscopic particles of gold, another interesting characteristic which can be made of commercial value, if properly approached, is that of the Brownian movement. Briefly, it may be stated that the submicroscopic particles of gold are subjected to molecular bombardment by the molecules of water or other enclosing liquid thereby tending to hold the particles of gold in suspension within the liquid itself and in a manner directly opposed to the force of gravitation. It must be kept in mind that these particles, while reduced practically to an individual molecular state, still maintain the inherent properties of the mass metal such as specific gravity and the inherent chemical properties and valances.

Considering the obvious factors which have been mentioned above, and further considering the fact that the older the placer deposit, the higher will be the percentage of submicroscopic and colloidal gold, it is evident that a process which will recover the more finely divided gold or metals of a more or less similar character is highly desirable. My invention, in its preferred form, contemplates the provision of a process and system capable of accomplishing the above result.

More specifically, my invention contemplates a method and means of separation which is particularly adapted for the separation of the heavier free metals such as gold from conglomerates and which utilizes a carrier liquid of one specific gravity in combination with a complementary separating liquid of higher specific gravity and a source of electricity, with the requisite control appurtenances to establish the critical conditions of velocity, pressure, and electrical characteristics necessary to separate and remove the undesirable particles of conglomerate from the free metals.

Other features, objects, and advantages of the invention will appear as the description proceeds in connection with the accompanying drawings wherein the system is illustrated schematically in one form in which it has been found to be highly successful.

In the drawings—

Fig. 2 is a vertical section through a portion of the device; and

Fig. 3 is a section substantially on the line 3—3 of Fig. 1.

Figure 1:
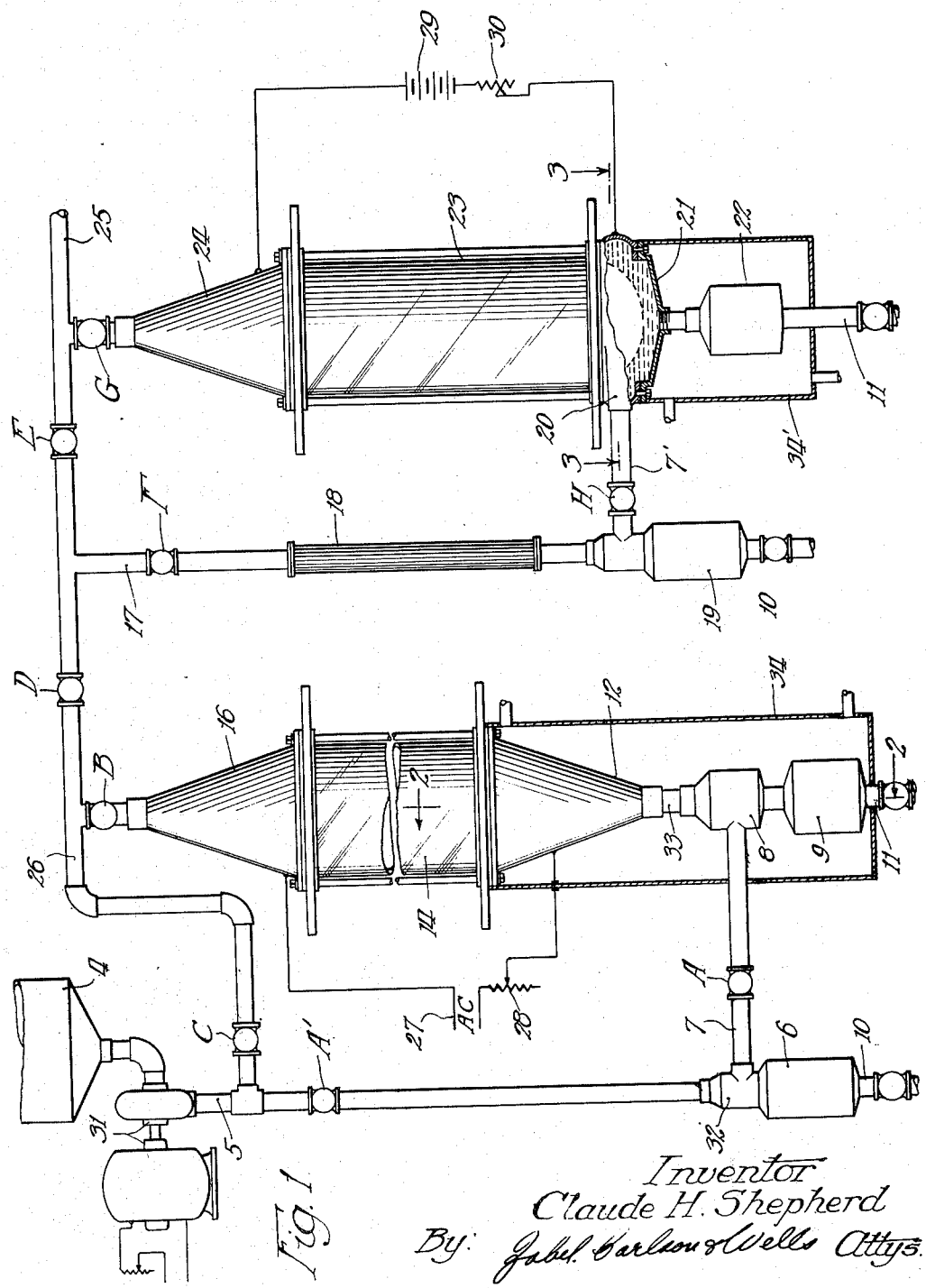
Fig. 1 is a schematic diagram of a system involving two stages of a device embodying the invention.

In Fig. 1, I have illustrated a mechanism for carrying out the purposes of my invention. This specific mechanism is particularly designed to recover gold and other heavy metals although not limited thereto. I will, however, in the description refer specifically to the recovery of gold as an example of the application of the invention. In Fig. 1, the numeral 5 constitutes the inlet pipe for material, and it is the purpose in this machine to introduce the material at a relatively high velocity at this point. For example, in the specific type of mechanism discussed hereinafter, the material preferably should have a speed of about thirty-five feet per second. This material passes over the reservoir 6 which may be filled with mercury and runs horizontally through the pipe 7 to the small chamber 8 above the mercury reservoir 9. For draining and removing the mercury, the usual discharge pipes 10 and 11 are provided, and these pipes may be equipped with suitable valves.

The material from the small chamber 8 passes upwardly into the lower flaring element 12 and spreads out in this flaring element. The chamber 8 is connected to the bottom of the flaring element 12 by a pipe 33 which as shown in Fig. 2 is substantially the same in diameter as the pipe 7 and the velocity of material therein will be sufficient to raise and balance the mercury in the lower part of the expanding cone 12. It is evident that the flowing material, which is preferably in a carrier such as water that is lighter than the material to be separated out, will lose its velocity rapidly as it rises in the flaring element here shown as a cone 12. A suitable screen 13 may be used to avoid the large bubbles of the incoming material and thus break it up into a more smoothly rising column which will aid in the separation.

Now, as the material rises, it reaches its lowest velocity in the chamber 14 wherein it may be observed, as for example, through the wall of the chamber which is of glass or other transparent material. The operator may thus be able to establish the best possible velocity and other conditions so as to obtain the proper separation. Also, he may observe any clogging effect that tends to take place and may overcome this tendency in any suitable manner, as for example by a sudden increase in the rate of flow. It appears that the travel is faster toward the vertical center line of chamber 14. It gives an illusion that the material next to the glass is moving downward.

The material in the carrier fluid is preferably caused to pass upwardly against the lower surfaces of mercury in the flaring element 12, the level of the mercury naturally rising to about the point indicated at 15 in Fig. 2. Inasmuch as the specific gravity of gold is practically fifty per cent greater than that of mercury, it is obvious that bringing particles of mass gold into intimate contact with the upper surface of a mass of mercury will result in gold sinking into and through the mercury exactly as sand in water, providing the surface tension of the mercury is overcome. However, in cases where a large percentage of the metal is represented by finely divided gold, it is obvious that these difficulties are greatly increased, due not only to the extreme fineness of the gold and the difficulty of bringing such particles into intimate contact with the mercury, but also in the difficulty of eliminating mechanical fouling of the surface of the mercury by other materials.

The compensating feature of the finely divided gold, however, arises from the fact that the more finely divided the particles of gold may be, the more susceptible the material will become to the process of amalgamation on account of the increased surface area per unit of volume. In addition, the elimination or nullification of the effects of the Brownian movement is highly desirable since it results in greater ease of handling submicroscopic gold by allowing its inherent properties to be brought into definite action.

The process of saturating mercury with amalgamable elements embodies two sharply distinct variations. In general, it may be said that the saturation is accomplished by intermolecular infiltrations whereby the molecules of the amalgamable element occupy the interstices between the molecules of mercury.

At the point of saturation of the mercury during this process, a certain percentage of the mercury body will become super-saturated and form a relatively solid amalgam of higher specific gravity than the mercury itself.

The second effect will consist in taking the finely divided particles or molecules of the amalgamable element into solution within the body of the mercury at a point below saturation.

Supersaturated amalgam may be separated from liquid mercury by straining through a chamois skin or other porous material. In order to separate the remaining material from the mercury, distillation is necessary.

To show an analogy in this process, the example of sugar sirup may be used. After such a sirup is super-saturated, wet sugar will precipitate, leaving additional sugar in the form of true sirup. This tendency may be taken advantage of in the manner herein described.

It will be noted from Fig. 1 that the stream of material containing particles of materials of different specific gravities will either carry the materials along or precipitate them out, depending upon the velocity of the fluid, the specific gravity of the material, the size of the particles, and the effect of gravity upon them.

Most of the materials contained in an alluvial or placer deposit are more or less inert from a chemical standpoint in their natural state. It has been shown herein that agitation and turbulation are secured by the means above mentioned, but this is merely the agitation in mass and not from a structural standpoint. It has been found by experiment and calculation that an increase of molecular activity, not only of the carrier fluid and the suspended materials, but also of any mercury which may be used is extremely desirable and increases the efficiency of the process. The inherent molecular activity may be amplified by any one of a number of means, among which might be mentioned chemical methods, electrification and ionization, but the commonest method, as well as the simplest, would be merely to heat the material. This has been done with definitely beneficial effects. At the same time that heated material is passed through the dwell chamber and placed under a condition of electrical and electro-static stress, it has been found that the electrical effect at increased molecular activity is much more efficient and effective than in a cold or sluggish state.

Inasmuch as the materials to be treated by this process exhibit a series of infinite variations, combinations and permutations, it has been found theoretically and empirically that a number of adjustments to compensate for various characteristics must be provided in order to maintain effective action. These adjustments include velocity, power, electrical stress, chemical effects, molecular activity, etc., it being necessary to provide means to adjust these factors in the handling of any individual conglomerate. As an example of the way in which the molecular activity may be amplified, I employ the heating jackets 34 and 34' which may be heated by steam or water.

It has been shown hereinbefore that mercury in this process may be chemically purified and placed in a condition ideal for recovery of heavy metals.

The conglomerate which is placed in contact with the mercury is natural and contains various elements which separate into two distinct classes, namely soluble and insoluble, and act as deleterious material tending to foul the mercury and to prevent its normal function from being exercised. The fundamental factors of the design of this process, as hereinabove described, permit a constant rejuvenation of the mercury by chemical and mechanical means, thereby tending to maintain the mercury in a condition suitable for efficient handling and recovery. To illustrate this point specifically, let us assume that certain metallic salts have become included within the mercury body. By raising the mercury level in the process unit at the salient points, the finely divided mercury may be brought into intimate contact with hot water either pure or containing suitable chemicals, and these soluble salts may be thus carried off in solution in the water. In addition, certain solids not capable of amalgamation may be thus separated from the mercury, those of higher specific gravity sinking toward the bottom and being separated by the normal gravity process, while the latter insoluble material will be driven to the top and carried off by the gradation of velocities upon which the fundamental design of this process is based.

In the system as shown, the stream of material has a high speed at certain points and a low speed at others, while at the same time a constant volume is being transmitted through the machine per given unit of time. Further, the system is so designed that the material is given a high velocity in a downward direction through the entrance pipe 5 and a low velocity in the upward direction as the material rises through the flaring element 12 and the chamber 14. The result will be to cause the heavier material to lag behind the lighter material while moving in an upward direction at low velocity, and the reverse effect is produced while the material is moving in a downward direction at high velocity.

Assuming that it is desired to deposit the heavier materials at predetermined points in the system or within properly designed reservoirs, it is obvious that some method must be used to prevent the accretion of conglomerate within the reservoirs, thereby filling all available space and rendering the reservoirs, incapable of use as collecting receptacles. To this end, it has been found that in the separation of light materials from heavy materials, it is desirable to use a liquid of intermediate specific gravity. In the case of gold and heavier metals being separated from sand, liquid mercury has this required property. Therefore, by filling the reservoirs such as 6 and 9 and even a lower part of the flaring element 12 with mercury and bringing materials of different specific gravities violently in contact with the surface of the mercury, the tendency would be for the heavier materials to pass into or to sink within the mercury mass, allowing the lighter materials to float upon the surface of the mercury and be carried off by the carrier fluid.

Primarily, the mercury is used as a separating liquid of intermediate specific gravity between that of the heavier metals and the main body of the conglomerate, thereby allowing free action of the various reservoirs and preventing fouling by extraneous materials. The process of amalgamation of gold or other metals with equivalent characteristics is incidental in as much as the fundamental principle of the process comprises the separation of materials of different specific gravities by the application of natural forces due to fundamental design. The facility with which mercury performs these functions makes its use ideal as a collecting agency for gold and similar metals which are capable of amalgamation. Mercury also effectually separates metals having a higher specific gravity than mercury, but not capable of amalgamation, in the form of a metallic precipitate. Notably, among this type of metals may be mentioned those comprising the platinum series, in as much as this group in metallic form possesses inherent specific gravities higher than that of mercury and in many cases higher than the specific gravity of metallic gold.

If we direct a carrier stream in a horizontal direction, it is possible to cause it to contact the upper surface of a body of mercury below the point of impingement, and the lower surface of a body of mercury above the point of impingement. Under this condition, it is plain that the upper body of mercury will be kept in a constant state of suspension and agitation by the velocity of the carrier stream and also that the upper body of mercury will offer resistance to the passage, not only of the carrier stream, but also to the passage of the particles of material included in the carrier stream in such a manner as to assist gravitation in separating the heavier materials from the lighter materials. To be specific on this point, the rate of acceleration or flotation of the lighter materials under these conditions will be in direct proportion to the specific gravity of mercury as compared to that of the lighter materials, and the deceleration of the heavier materials will follow the inverse ratio of relative specific gravities.

From an inspection of Fig. 1, it will be evident that the passage of the carrier stream into the chamber 8 and upwardly through the flaring element 12 accomplishes this result. At the same time, the increase in the cross section of the channel or passage tends to produce deceleration of the carrier stream to a point where its velocity is insufficient to carry off the particles of heavier materials but ample to maintain the carrying velocity of the lighter particles. It is obvious, therefore, that the heavier material will be left behind at this point.

Further considering the low velocity of the carrier stream during this period, that is, during its passage upward through element 12 and chamber 14 as a period of approximate dwell, it is also plain that the velocity of the carrier stream must be restored to its original value in order to maintain progress of the conglomerate. The lower part of the conglomerate just above the mercury is continually being forced upward by the impact of the lighter materials and carrier fluid as they rise to the surface of the mercury. The rise of this material through the glass chamber is relatively very slow compared to the travel through the mercury and reduced parts of the system. This is of particular advantage in the electrical treatment in the chamber 14.

At the top of the chamber 14, therefore, I provide a downwardly flaring element 16 where the velocity of the stream is again increased due to the pressure behind it, and the gradual decrease in the cross-section of the channel, and the stream is carried through the pipe 17, which preferably has the electrically insulated section 18 inserted therein, down to another reservoir 19. The material then passes horizontally into the volute shaped bowl 20 and is given a high speed circular movement, thus to take advantage of the resulting centrifugal force to separate the heavier particles from the lighter particles by this action. The mercury level takes the form shown in Fig. 1 in bowl 20.

Beneath the bowl 20 is a sump 21 and a drain reservoir 22 which provide a settling basin for the heavier particles to settle into the liquid of intermediate specific gravity, such as mercury. The carrier stream is then directed up through the chamber 23 which, like chamber 14, may be constructed of glass to another downwardly flaring member 24 and thence through the pipe 25 to discharge or to another stage of separation if such is necessary.

The connections to the various units of the system are controlled by suitable valves such as the valve A in the pipe 7 and the valve B at the outlet of the member 16. Then there is a cross connecting pipe 26 connecting the inlet pipe 5 to the outlets of members 16 and 24 and to the upper end of pipe 17. In this cross connecting conduit, there are provided three valves C, D, and E. Pipe 17 is controlled by a valve F, and likewise the outlet of 24 is controlled by a valve G. Another valve H may be inserted between the reservoir 19 and the bowl 20.

The purpose of these valves and auxiliary connections is to permit the isolation of any particular stage or stages of the device while continuing the operation through the other stages. As for example, when it is desired to drain or repair the first stage consisting of the chamber 8 and the members 12, 14, and 16, valves A and B which are normally open, are closed, or the valve A' in pipe 5 and valve B may be closed and the valve C open. Valve D is normally open as are the valves F and H while the valve E is normally closed like valve C. It is evident, therefore, that, with valves A and B closed, the first stage can be drained or repaired while the separation is continuing in the second stage.

Furthermore, by closing the valve A and valve D and opening valves C and B, the pressure in the pipe 5 can be directed backwards through the first stage, and, by opening the valve in the outlet 11 after the mercury has been drained off, the unit may be scavenged or cleaned by flowing a cleaning substance or liquid backward through it.

It will be noted that in the case of both stages, a source of electric current is connected across the polarization chamber in which the dwell period occurs. This source of electric current may have any suitable control mechanism for controlling the proper voltage and current supply. For example, in connection with the first stage, I have shown the source of alternating current at 27 as connected through an adjustable resistor 28 so as to pass a regulated amount of alternating current through the material as it is being directed upwardly through chamber 14. In connection with the chamber 23, I have shown a source of direct current similarly provided with means for adjusting the potential, as for example the source of current is indicated as a battery 29, and the adjusting means as an adjustable resistance 30.

In connection with eliminating the effect of the Brownian movement in the material being passed through the system, I have found that, while the metal in the material presumably carries a charge similar to that of ground, this is not always found to be the case in actual practice. Therefore, if I connect a source of direct current across the ends of the chamber 14 to send current in one direction only, I find that it does not always aid in separating out the metal from the other material at this point. In some cases, it appears to be in the right direction, while in other cases it does not. However, with a source of alternating current, it seems that the current flowing in the one direction does overcome the Brownian movement or eliminate its effect at least for half the time, and the gold, in the case where free gold is being separated, will always accumulate at the inner surface of the glass. Should the direct current happen to be connected up in the right direction, this phenomena also occurs upon the passage of the direct current. That is to say, the metal approaches the outside of the chamber and collects along the surface of the glass.

While the underlying principles governing this action are not fully clear to me and, therefore, I do not wish to be bound by the theoretical explanation hereinafter given, one explanation which suggests itself is that the metallic particles or molecules in the material moving upwardly in the chamber 14 carry a charge and these particles all carry a like charge so that they repel each other. Upon the passage of the current through the chamber, it appears that the glass, being a dielectric, tends to gather upon itself a charge of opposite polarity to that of the metallic particles and thus attracts the particles to the surface of the glass where they remain separated out from the remaining material. In actual operation of this device, I have obtained free gold in the form of a coating on the interior of the surface of the glass.

In the specific description hereinbefore given, I have referred always to the separation of a heavier material as the material to be saved from a lighter conglomerate. It is obvious, however, that the device may be used equally well to save or collect a lighter material from a heavier conglomerate in which case the heavier material forming the greater bulk will need to be taken off from the reservoirs such as 6, 9, 19, and 22 in large quantities while the lighter material will be left in the carrier fluid and recovered therefrom after the separation has taken place, as for example by running the pipe 25 to a suitable recovery device where the lighter material may be separated from the liquid.

In the event where the supply of carrier fluid is valuable or scarce, it is obvious that the carrier fluid from the pipe 25 may be cleaned and saved for recirculation in any well-known manner. There are many well-known systems for cleaning and reconditioning fluids which are used to put them in condition for recirculation, and I, therefore, do not deem it necessary to show such a device since it forms no part of the present invention.

In the operation of this device where gold was being separated from a sand conglomerate, difficulty has been encountered because of fouling of the mercury used in the system, and this was discovered to be due to oil and grease in the unit itself. In order to overcome this difficulty, a concentrated lye solution was placed in the feeder tank 4 which normally supplied the conglomerate to the pipe 5, and this material was pumped through the unit several times in order to eliminate the oil and grease. This example was merely given to illustrate how it is possible in this system to chemically purify the unit or to treat the system with a suitable chemical whether it be for purification or other purposes.

The pumping unit, consisting of a pump and a variable speed motor which is indicated at 31 for supplying the necessary velocity or head to the material in the pipe 5, may be of any suitable type and may be provided with any of the usual regulating devices whereby the speed and volume of the material can be varied to obtain the best results for any given material.

In order that the complete operation may be clear and understood, I will now describe the passage of the material through this system and the action at each stage.

Assuming that the material is in the feeder tank 4, it is fed into the pipe 5 by means of the pump unit 31 at a suitable velocity. In the case of gold, the reservoirs 6, 9, 19, and 22 will have been supplied with mercury to such an extent that these reservoirs are filled, and preferably the horizontal pipes such as 7 and 7' are full of mercury with some excess in the system. The pipe 5 connects to pipe 7 and the reservoir 6 by means of an enlarged T connection 32 so that the material in passing down is slightly reduced in velocity at this point and impinges directly on top of the mercury in the reservoir 6. The material will, of course, force the mercury out of the pipe 7 into the chamber 8, and the excess will go up into the flaring element 12.

As the material impinges on the upper surface of the mercury in the reservoir 6, the heavier material striking the surface will be driven into the body of the mercury, and, in the case of gold and other metals capable of amalgamating with mercury, will form an amalgam with the mercury in the reservoir 6. The carrier stream flowing horizontally through the pipe 7 will carry off the lighter material from the top of the reservoir 6 since it cannot sink in the mercury, and also the heavier particles which do not get a chance to sink in the reservoir 6 will be carried along with the other material.

In the chamber 8, which is also an enlarged T connection to the end of the pipe 7, the material impinges on the upper surface of the mercury below the level of the pipe 7 and upon the lower surface of the mercury above this level. The line of escape being upwardly through the reduced neck 33 leading from chamber 8 to the flaring member 12, the carrier stream will take this path, and the velocity will be increased at the reduced portion 33. The carrier stream will bubble up against the lower surfaces of the mercury in the member 12 and will be broken up by the screen 13 as it moves upwardly. The lighter particles being aided by their being lighter than the mercury, will travel faster than the heavier particles which are retarded due to their being heavier than the mercury.

Thus a continual settling or separation will take place in the member 12, and, as the material passes upwardly at a relatively low velocity through the chamber 14, it is subjected to the electrical action which tends to separate out the colloidal and submicroscopic particles of gold. These particles collect on the wall of the chamber 14.

The velocity of the carrier stream is then increased through the member 16, and the material passes over through a section of the pipe 26 to pipe 17 and down through the insulated section 18 to the chamber 19 where the process which took place at the top of the reservoir 6 is again repeated and the material is passed horizontally into the bowl 20 where the whirling action is imparted to the stream.

The mercury level at this point is preferably such that the lower part of the bowl is filled with mercury substantially up to the level of entrance of the carrier stream. The heavier particles, therefore, are brought into contact with the mercury and are forced outwardly by centrifugal action. Furthermore, this action brings the heavier particles more closely to the glass of the chamber 23 so that a further collection if any gold remains takes place because of the electrical effect hereinbefore described. The upper member 24 again increases the velocity of the carrier stream which is discharged through the outlet pipe 25.

In practicing my invention hereinbefore described, I find that it is not practically possible to set forth exactly the critical characteristics thereof because they may vary with the characteristics of the material being separated. There are, however, certain characteristics which appear to me to be controlling. For example, where the material in its carrier fluid is forced laterally into the chamber 8, the head or velocity of the material should be sufficient to; first, just force the material beneath the mercury above the entering stream. (The lesser specific gravity of the carrier fluid and the lighter particles of the conglomerate will cause them to rise through the mercury at a substantial velocity.) Second, the velocity should be such as to overcome the surface tension of the mercury below the entering stream thus causing the meeting surface between the mercury and incoming stream to take the characteristic shape indicated generally by the line 8a in Fig. 2. Another characteristic feature of the invention is the dwell chamber and electrical treatment after the material has passed through the mercury. This chamber, having transparent walls, facilitates observation by the operator at the critical and low velocity part of the system. The system also separates by directing the material against the mercury at high velocity initially, and in the second stage sets up a whirling movement of the material to permit centrifugal separation. I have found that the system embodying the aforementioned features enables me to completely remove the gold from a gold bearing deposit rapidly and economically. Numerous tests at the discharge end of the system have shown the material to be completely devoid of any trace of gold, and the gold recovered exceeded the expected amount.

From the above description, it is believed that the nature and operation of my invention will be clearly apparent to those skilled in this art and the advantages thereof readily apparent.

It is also believed to be obvious that various modifications may be made from the exact details shown and described both as to the method and the system for carrying out the method. It is to be understood, therefore, that the disclosure is illustrative only and is not to be taken as limiting the invention except in so far as it is limited by the claims.

Having thus described one specific form of my invention, what I claim as new and desire to secure by Letters Patent is:

1. A method of separating heavy free metals from lighter materials such as sand, etc., which consists in feeding a stream of the mixed materials and metals in a light carrier fluid such as water at a velocity sufficient to carry the metals and materials without appreciable separation, laterally into a body of mercury, thereby separating said body into a lower portion, the upper surface of which is contacted by the stream and an upper portion through which the stream rises, expanding the stream in cross section to reduce it to a velocity insufficient to carry the metals and materials while directing the stream upwardly, and passing an electric current through the slowly rising stream after it has left the mercury.

2. A method of separating heavy free metals from lighter materials such as sand, etc., which consists in feeding a stream of the mixed materials and metals in a light carrier fluid such as water at a velocity sufficient to carry the metals and materials without appreciable separation, laterally into a body of mercury, thereby separating said body into a lower portion, the upper surface of which is contacted by the stream and an upper portion through which the stream rises, expanding the stream in cross section to reduce it to a velocity insufficient to carry the metals and materials while directing the stream upwardly, passing the stream through a channel of dielectric material and applying electrical energy thereto while the stream is passing through the channel.

3. A method of separating heavy free metals from lighter materials such as sand, etc., which consists in feeding a stream of the mixed materials and metals in a light carrier fluid such as water at a velocity sufficient to carry the metals and materials without appreciable separation, laterally into a body of mercury, thereby separating said body into a lower portion, the upper surface of which is contacted by the stream and an upper portion through which the stream rises, expanding the stream in cross section as it moves upwardly through the mercury and above the mercury to reduce it to a velocity insufficient to carry the metals and mercury while directing the stream upwardly.

4. A continuous process of separating solid materials of different specific gravity comprising, first mixing said materials with a light carrier liquid and imparting to the mixture a high velocity head to cause the liquid to carry all the material, then directing the stream of liquid and solid material downwardly against the top surface of a body of liquid which has a specific gravity above the specific gravity of part of the solid materials and equal to or below the specific gravity of the remainder of the solid materials, thereafter directing the stream laterally from the top surface of said liquid body into a second body of the last named liquid at a velocity sufficient to penetrate the liquid and allow the materials lighter than said last named liquid to rise therethrough, expanding the stream in cross section and moving it upwardly at a relatively low velocity, and thereafter increasing the velocity of the stream by reducing the cross-section thereof directing the high speed stream into a spiral path over and in contact with a third body of said last named liquid and expanding the cross sectional area of said stream and moving it directly upward over said third body at a relatively low velocity.

5. A method of separating finely divided solid materials of different specific gravity which comprises transporting the materials in a light carrier liquid at a sufficient velocity head to cause the liquid to carry all of the material, directing the high velocity stream upwardly against the bottom of a body of liquid which has a specific gravity substantially greater than that of the carrier liquid and of part of the solid materials but equal to or less than that of the remainder of the solid materials, raising and supporting said body on said carrier stream, gradually expanding the combined cross sectional area of the stream and body from the bottom of said body upwardly to the top of the body until the velocity of the stream is reduced below that necessary to carry the liquid of high specific gravity and the heavier materials but is sufficient to carry the materials lighter than said liquid of high specific gravity upwardly from the top of said body, and discharging the stream upwardly from said body at said lower velocity.

6. A method of recovering gold and similar heavy metals from mixtures of solids in finely divided form which consists in transporting the mixture in a stream by means of a carrier fluid of water in which the solids are intermingled so as to provide a fluid mass, directing the stream upwardly against the bottom surface of a body of mercury raising and supporting the body of mercury on the carrier stream, gradually expanding the combined cross sectional area of the stream and mercury upwardly until the stream velocity is too low to entrain the mercury but is sufficient to carry off the solids lighter than mercury upwardly and directing the low velocity stream upwardly a substantial distance above the mercury to a discharge point.

7. A method of recovering gold and similar heavy metals from mixtures of solids in finely divided form which consists in transporting the mixture in a stream by means of a carrier fluid of water in which the solids are intermingled so as to provide a fluid mass, directing the stream upwardly against the bottom surface of a body of mercury raising and supporting the body of mercury on the carrier stream, gradually expanding the combined cross sectional area of the stream and mercury upwardly until the stream velocity is too low to entrain the mercury but is sufficient to carry off the solids lighter than mercury upwardly and directing the low velocity stream upwardly a substantial distance above the mercury through a glass channel to a discharge point.

8. A method of recovering gold and similar heavy metals from mixtures of solids in finely divided form which consists in transporting the mixture in a stream by means of a carrier fluid of water in which the solids are intermingled so as to provide a fluid mass, directing the stream upwardly against the bottom surface of a body of mercury raising and supporting the body of mercury on the carrier stream, gradually expanding the combined cross sectional area of the stream and mercury upwardly until the stream velocity is too low to entrain the mercury but is sufficient to carry off the solids lighter than mercury upwardly and directing the low velocity stream upwardly a substantial distance above the mercury through a glass channel to a discharge point and passing an electric current through the stream while it is in said glass channel.

CLAUDE H. SHEPHERD.